2 Sheets--Sheet 1.
W. H. BROWN.
Machine for Shaping Molding Machine Cutters
No. 133,627.  Patented Dec. 3, 1872.
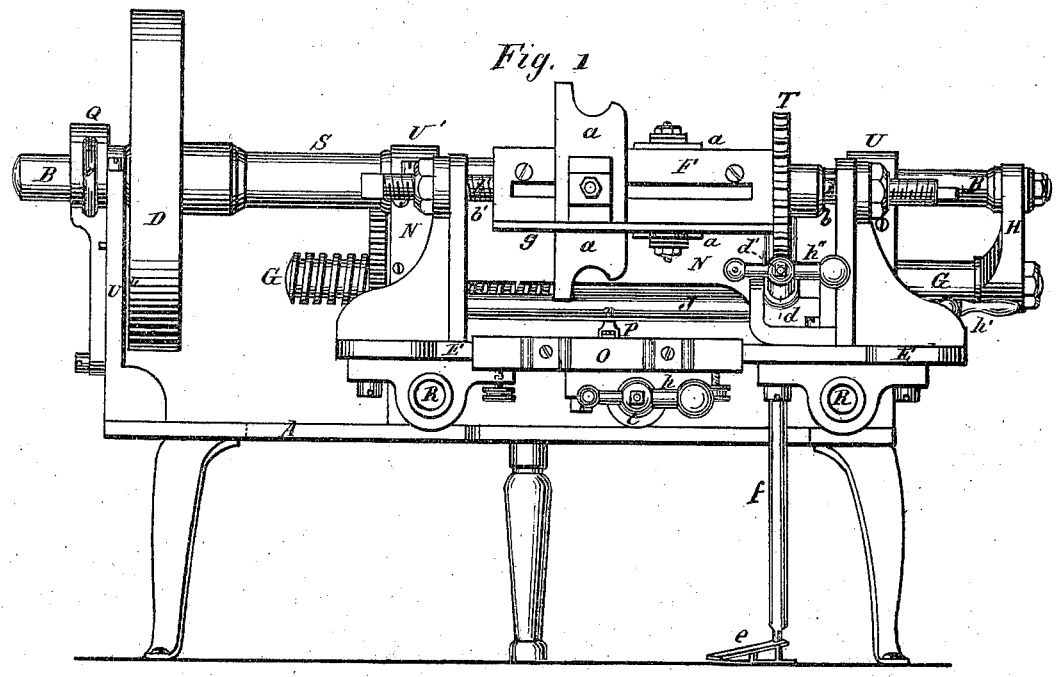
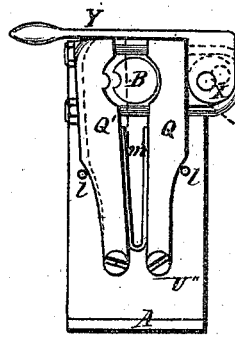
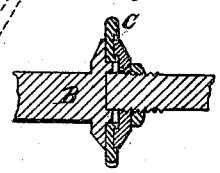
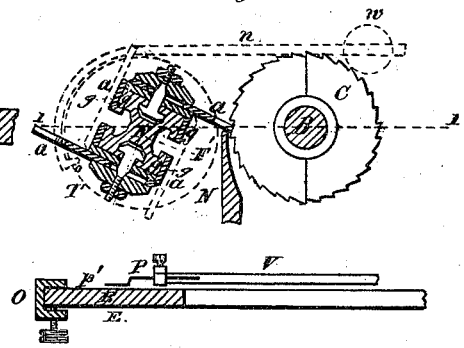
Witnesses  Inventor 2 Sheets--Sheet 2.
W. H. BROWN.
Machine for Shaping Molding Machine Cutters.
No. 133,627. Patented Dec. 3, 1872.
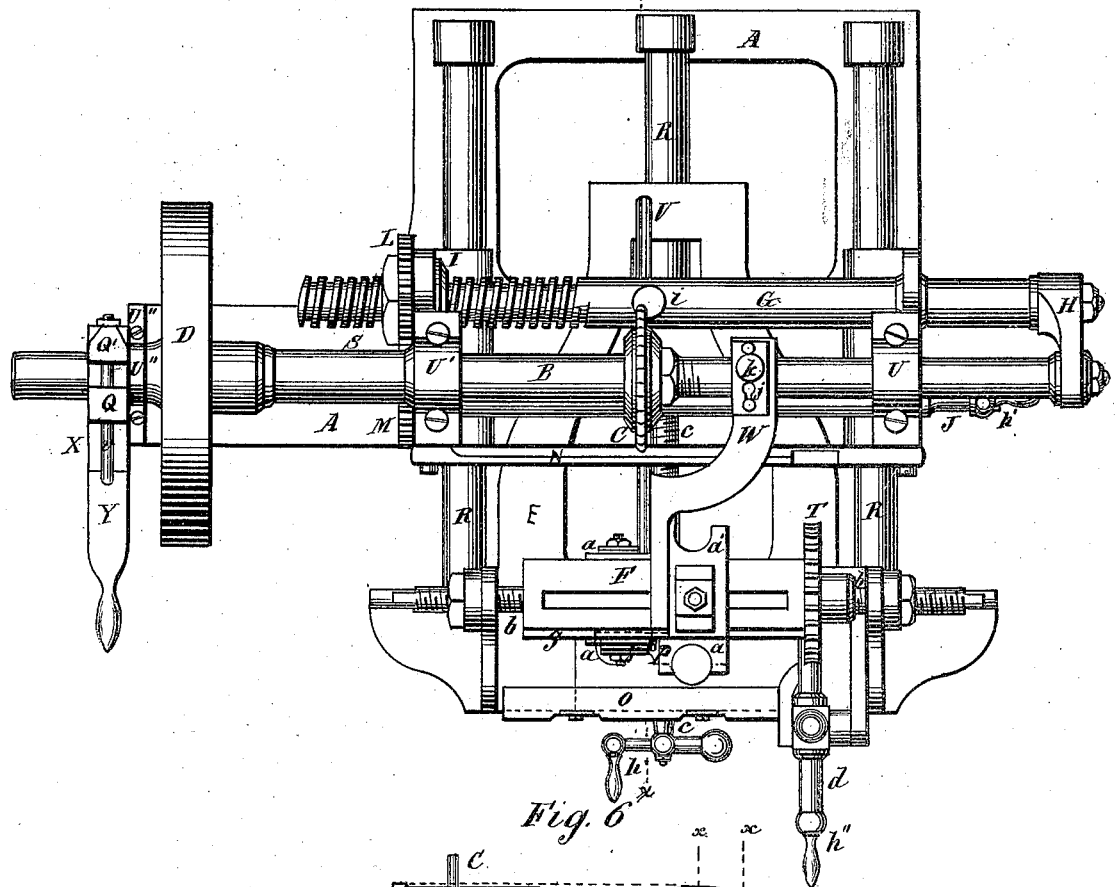
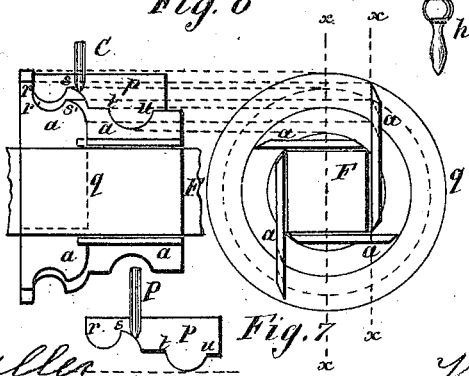
Witnesses
Inventor

UNITED STATES PATENT OFFICE.

WILLIAM H. BROWN, OF WORCESTER, MASSACHUSETTS.

IMPROVEMENT IN MACHINES FOR SHAPING MOLDING-MACHINE CUTTERS.

Specification forming part of Letters Patent No. 133,627, dated December 3, 1872.

*To all whom it may concern:*

Be it known that I, WILLIAM H. BROWN, of Worcester, in the county of Worcester and State of Massachusetts, have invented certain Improvements in Machinery for Shaping Cutters for Molding-Machines, of which the following is a specification:

This invention relates to a machine for forming the edges of cutters which are to be secured to the rotating shafts or heads of machines for cutting moldings from wood or other material; and relates more particularly to the employment of a rotating shaft corresponding in transverse section with the cutter-head, on which the cutters, when formed, are to be used in combination with a rotating cutter of any convenient form for operating on the blanks to reduce them to the desired shape; also, a device for securing any pattern, and an indicator by which said pattern may be traced as a guide for shaping the cutters, together with other appliances hereinafter described.

Figure 1 is a front elevation of a machine embodying my invention. Fig. 2 is a plan of the same. Fig. 3 is a partial transverse section through the line $x$ $x$ on Fig. 2. Fig. 4 is a sectional view of the cutter C, showing the manner in which the sections of the cutter are secured on the arbor. Fig. 5 is a view of the device for clamping the arbor B to hold it firmly while turning the nut thereon for securing the cutter C. Figs. 6 and 7 are diagrams explanatory of the principles of operation of the machine, Fig. 6 being an end view representing the shaft F with cutters $a$ attached, and Fig. 7 a section of the same made in the plane of its axis.

A is the frame of the machine, from which rise the pillars U U' U'' forming bearings for the arbor B, and in two of which, U U', are those of the shaft G and the pinion-shaft J. C' is a rotary toothed cutter secured on the arbor B, designed to operate on the blanks $a$, to reduce them to the proper form. D is the driving-pulley in spline-gear with the arbor B, and S is a sleeve to hold the said pulley against the pillar U'' by encircling the arbor B between it and the bearing U'. Attached to the main frame A are the horizontal cylindrical ways R, which are parallel with each other and transverse to the axes of the arbor B and the shaft F. On these ways works the sliding frame E, supported by which, on adjustable centers $b$, is the rotating shaft F, the axis of which is parallel with that of the arbor B. On this shaft F are confined the blanks $a$ to be acted upon by the cutter C to shape them for molding cutters. The movement of the frame E on the ways R is produced by the screw-shaft $c$, which has a handle, $h$, by which it is operated. This shaft has a bearing attached to the under side of the sliding frame E, while the screw portion works in a nut attached to the main frame A. On one end of the shaft F is fixed the worm-wheel T, into which gears a worm or screw on the shaft $d$. The front bearing of the shaft $d$ is pivoted to the frame E, while the rear bearing works perpendicularly in guides attached to the same, and is connected by the rod $f$ with the foot-lever $e$.

When it is desired to turn shaft F the tangent screw or worm is made to engage with the wheel T. By depressing the lever $e$ the shaft $d$ may then be rotated by its handle $h$ to bring the blanks in position on the rest N, and retain it there while being shaped. When this is completed on one of the blanks the foot is removed from the lever, allowing the screw-shaft $d$ to drop, thus leaving the shaft F free to be turned by the hand to bring another blank to the cutter with greater facility than could be done by the slow action of the screw. The shaft F should be made to correspond in size with the smallest cutter-head commonly used in molding-machines, and can be enlarged to adapt it to a larger-sized head by the addition of plates $g$ between it and the blanks; or any number of heads of different forms and sizes may be kept on hand, to be used as occasion requires. The arbor B, besides its rotary, has a longitudinal motion, in its bearings, to such extent as to allow the cutter C to traverse the whole length of that portion of the shaft F on which the blanks $a$ are confined, the pulley D being in spline-gear with said arbor. This longitudinal motion is communicated to the arbor B by the revolving nut I on the screw portion of the shaft G, and which forms a bearing for that end of the latter. This shaft G is rigidly connected at its outer end by an arm, H, with the arbor B, in which arm the latter turns freely, but is prevented by collars and a nut on its outer end from sliding therein, that portion of the shaft G between the screw and the arm H sliding freely in a bearing in the pillar U. The nut I, rotating in its bearing in the pillar U', has a shoulder on one side, and the toothed wheel L, secured by a nut on the other, prevents its motion endwise. A pinion, M, is secured on one end of the shaft J, and the handle $h'$ to the other end, so that by rotating this shaft J the nut I, through the screw-shaft G and arm H, causes the extension or retraction of the arbor B, making the cutter to travel from end to end of the blank by the teeth of the pinion engaging with those of the wheel L. The bed of the frame E (see Fig. 3) underneath and partially in front of the shaft F, being parallel with the ways R, and consequently with a plane in which are the axes of the arbor B and the shaft F, serves as a tablet on which, by means of a clamp, O, on the front edge thereof, may be confined any pattern or drawing $p'$, representing the transverse section of a molding to form which it is desired to shape the cutters. Projecting from the shaft G to and over this tablet is a rod, V, which may be extended or shortened at pleasure, and held in any desired position by the set-screw $i$. The front end of this rod carries a thin slip of metal, P, which serves as an index, and, by operating the screw-shafts $c$ and J, is made to follow the lines of the pattern or drawing, and thus governs the shaping of the cutter. W is an arm supported on the arbor B, and acts as a guide, when clamped thereto, against which to place the blanks $a$ in order to secure the two of a pair in the same relative position on the opposite sides of the shaft F, and truly at right angles with it. This arm is held by the clamp $j$ and set-screw $k$ while the blanks are being secured, after which it may be released from bite on the arbor. The device shown in Fig. 5 is for clamping the arbor B to hold it firmly while the nut is being turned to secure the cutter C, or for releasing the same. It consists of the jaws Q Q', an eccentric, X, with a lever, Y, attached, a staple, $v$, and a spring, $m$. The jaws Q Q' are confined at their lower ends to the pillar U'' in such a manner as to allow of a limited motion. Their upper portions, resting, when not in use, against the pins $l$, are kept in that position by the spring $m$. These jaws, at their upper ends, are made concave to fit the arbor B, and one of them, Q', has a spline which, when in use, enters the slot in said arbor. The eccentric X is composed of two parts, united by the lever Y, between which is a collar or sheave, through the center of which passes the pin on which the eccentric works. The staple $v$ encircling this sheave passes through both the jaws Q and Q', and is secured by nuts bearing against Q'. By this means the device is adjusted, so that when the lever Y is brought forward and pressed downward the jaws are made to gripe the arbor firmly; and, when not in use, the lever Y is thrown back and rests on the top of the jaws, releasing the arbor B. The cutter C is made in two or more sections, as seen in Fig. 3, and in one side thereof is an annular recess, into which fits a corresponding projection from the adjacent collar, (see Fig. 4,) by which the sections are firmly secured. This construction has another advantage, especially in cutters of large size, in that the liability to crack or spring during the process of hardening is materially lessened. The cutters $a$ are formed as sections of solid wheels, the peripheries of which corresponds with the section of a molding to be made by them. (See Figs. 6 and 7, in which $p$ represents the transverse section of a molding, and $q$ that of a solid wheel, the outline $r$ $s$ $t$ $u$ being common to both.) $r'$ $s'$ represent the outline of one of the cutters $a$ as projected from Fig. 6. The index P, in consequence of its connection with the shaft G, will have the same longitudinal motion as the cutter C; and the diagram $p'$, being confined on the bed of the frame E, will have a transverse motion with the shaft F, on which are secured the blanks $a$. If, therefore, the index P, by the combined movements of the arbor B and frame E, be made to traverse the outline of the diagram $p'$, the cutter C will be caused to shape the blanks $a$ so as to produce a molding of corresponding form with such diagram.

In operating the machine the rest N may be used in the plainer class of work, the blanks being stationary during the operation of shaping, in which case a lever, $n$, and weight $w$ may be hooked onto the wheel N, as shown in Fig. 3, to hold the blank steady on the rest; or the rest may be removed and the shaft F be rotated by means of the worm-wheel T, and screw in the same direction as that of the cutter C. Therefore, in using the rest N each one of the blanks $a$, in succession, is subjected to the continuous action of the cutter C until finished, the index P being made to follow the lines of the drawing during the operation. Without the rest the two blanks on the opposite sides of the shaft F are successively brought to the action of the cutter C, the index remaining stationary during one rotation of the shaft F.

What I claim as my invention, and desire to secure by Letters Patent, is—

1. The combination of the reciprocating shaft B and its milling-cutter C with the transversely-sliding table E and index P, substantially as and for the purpose specified.

2. The rest N, in combination with the blank-shaft F and cutter C, as and for the purpose set forth.

3. The pattern-table E and its clamp O, in combination with the index $p'$, for operation as specified.

4. The arm or gage W, in combination with the arbor B and blank-shaft F for adjusting the set of blanks, substantially as described.

5. The combination of the sliding screw-shaft G and its geared stationary nut I with the arbor B, as shown and described.

6. The clamps Q Q' and their eccentric operating-lever Y, in combination with the arbor B, substantially as and for the purpose set forth.

WM. H. BROWN.

Witnesses:
  M. G. FULLER,
  CHAS. ANDREWS.